United States Patent [19]

Wang et al.

[11] Patent Number: 5,126,513
[45] Date of Patent: Jun. 30, 1992

[54] INTERACTIVE DISPLAY SYSTEM

[75] Inventors: Xiu Wang; Henri E. M. Mélotte, both of Eindohoven, Netherlands

[73] Assignee: U.S. Philips Corporation, New York, N.Y.

[21] Appl. No.: 698,520

[22] Filed: May 10, 1991

[51] Int. Cl.⁵ ............................................. G08C 21/00
[52] U.S. Cl. .................................... 178/19; 178/18; 340/709; 307/907
[58] Field of Search .................... 178/19, 18; 340/709; 367/120, 125, 907

[56] References Cited

U.S. PATENT DOCUMENTS

| 4,758,691 | 7/1988 | De Brugne ........................ 178/19 |
| 4,885,433 | 12/1989 | Schier ............................... 178/19 |
| 4,910,363 | 3/1990 | Kobayashi et al. ............. 178/19 X |

Primary Examiner—Stafford D. Schreyer
Attorney, Agent, or Firm—Robert J. Kraus

[57] ABSTRACT

In an interactive display system, a transmitter is provided for transmitting a periodic signal to a plurality of receivers through the air. One or more phase differences are measured between the receiving at pairs of receivers. These phase differences control the coordinates of a locator on a display screen. Separate measured phase differences control the positions along different coordinate axes independently.

20 Claims, 3 Drawing Sheets 5,126,513

INTERACTIVE DISPLAY SYSTEM

BACKGROUND OF THE INVENTION

The invention relates to an interactive display system, comprising
- a transmitter, for transmitting a periodic signal which is suitable for propagation through the air to
- a plurality of substantially pointlike receivers at respective fixed positions with respect to each other, whereas a relative position of the transmitter with respect to the plurality of receivers is manipulatable, the receivers being suitable for receiving said periodic signal, a first and a second receiver from the plurality feeding
- first phase difference measuring means, for measuring a first phase difference between said receiving the periodic signal at the first and second receiver, the first phase difference measuring means feeding
- location control means, for on the basis of a received phase signal controlling a target location on the display screen.

Such a system is known from the U.S. Pat. No. 4,885,433.

The object of the known system is to determine the position of the transmitter in a plane or in three dimensional space. In case of the plane, the device performs as a computer mouse and the target location is, for example, represented by a cursor on the display screen.

When the transmitter is moved in a plane and receivers are at known positions, a measured first phase difference between the receiving at the first and second receivers indicates that the transmitter must be located on a first two dimensional surface of positions in space. A similarly measured second phase difference between the receiving at a third and fourth receiver (one of which may be the second receiver), indicates that the transmitter must be located on a second surface in space. Using also the restriction that the transmitter lies in the plane, the position of the transmitter is determined by solving for the intersection of the first and second surface and the plane.

Alternatively, the known system uses a fifth and sixth receiver for determining a third phase difference which provides a third surface, which can be used instead of the plane when the position is solved by calculating the intersection of three surfaces.

The known system has the disadvantage that the position must be solved from a set of non linear equations defining the surfaces. This requires a substantial amount of computing power.

SUMMARY OF THE INVENTION

Amongst others, it is an object of the invention to provide an interactive display system which requires less computation power than the known system.

The interactive display system according to the invention realizes the object because it is characterized, in that the location control means are arranged for controlling a first coordinate of the target location along a first predetermined coordinate axis on the display screen, independent of a second coordinate along a second coordinate axis which is oriented across the first coordinate axis.

In this way, a single phase difference is used to control a single coordinate. This reduces the processing power required as compared to the case where several phase differences are combined to determine a point of intersection. As a disadvantage, two movements of the transmitter with respect to the receivers with equal direction and amplitude but starting at different positions, will not, in general, correspond to movements of the target location with either equal direction or equal amplitude. This effect may be minimized locally by a suitable placement of the receivers, but it can not be eliminated entirely. This is because by using an independent coordinate, a linear relation between the target location on one hand and the position of the transmitter with respect to the receivers on the other hand is no longer possible. However, because the target location is shown on the display screen, a user of the system is able to correct for this. Moreover, when the transmitter, for example, is manipulated by head movements or free air hand movements, a precise control of the transmitter position without feedback from the display screen is near impossible anyway.

For one-dimensional applications of the system according to the invention, such as using the target location to select from a linear menu of choices, only one receiver pair is required. In two dimensional applications, only two receiver pairs will be required; for this purpose the interactive display system according to the invention is characterized, in that
the location control means are arranged for controlling the second coordinate of the target location with respect to the second coordinate axis, under control of the second phase difference signal, independent of the first phase difference signal.

In a further embodiment of the interactive display system according to the invention, the first, second, third and fourth receivers exhibiting respective first, second, third and fourth spatial cones of directions of highest directional receiving sensitivity, is characterized in that the first, second, third and fourth receivers are directed such that the first, second, third and fourth spatial cones overlap in a manipulation region, the manipulation region not including a plane through the first second and third receivers. Direction sensitivity of receivers is a common phenomenon, which restricts the regions in which the transmitter can advantageously be used. By placing the region in which the transmitter is best placed for optimal response of the receivers out of the plane of the receivers, the optimal response is attained in a region where the relation between transmitter movements and measured phase differences is more nearly linear than among the receivers.

An additional advantage of placing said region outside the plane, is that the sensitivity cones can be maximally exploited, because in this region the movements of the transmitter are not obstructed by the receivers. The relative manipulability of the transmitter with respect to the receivers is physically obstructed in said plane of the receivers, due to the physical presence of the receivers (this is particularly important if, for example, the transmitter is placed on the head, since the head is usually rather bulky and thus very susceptible to obstruction; moreover, also from the plane of the receivers is also disadvantageous from the signal passing point of view since the head may obstruct the periodic signal on its way from the transmitter to any one of the receivers; similar observations hold for hand held transmitters).

Preferably, said manipulation region is a manipulation cone extending to infinity. In this way the manipulation region is not geometrically limited, and improved linearity can be obtained by increasing the distance between the receivers and the transmitter. Since the measurement of phase differences between receivers does not require any phase reference signal transported by cable, there need not be any restriction to the distance from a connecting cable either.

It is not necessary that the coordinate axis and the further coordinate axis cross at right angles. However, in order that movements of the transmitter relative to the receuvers correspond roughly to movements of the target on the screen, it is convenient that the first coordinate axis and the second coordinate axis cross each other at an angle, a first line through the first and second receivers making the same angle with respect to a second line through the third and fourth receivers.

It is furthermore advantageous that the angle is 90 degrees. In, for example, personal computers, existing connections for location control (such as mouse connections) are designed for control via orthogonal coordinate axes. An interactive display system according to the invention can advantageously use such connections if the angle is 90 degrees.

The number of receivers can be restricted to three, when the second receiver is also the fourth receiver. In this case it is convenient that the first, second and third receivers form three corners of an isosceles triangle, the third receiver being at the top angle, the second coordinate axis being perpendicular to the coordinate axis, the second phase difference being determined as a sum of further phase differences between the receiving at the first and third and the receiving at the second and third receivers respectively. Since in an isosceles triangle the median line, which runs from the top corner and intersects the base line halfway, is automatically perpendicular to the base line, the coordinate axis and the further coordinate axis can be taken orthogonal, whereas the required processing is restricted to a summing operation.

Any processing operations, intended to improve the robustness or user comfort of the interactive display system according to the invention can also be applied separately to separate phase differences. This reduces the complexity of such processing operations as compared to the case where the phase differences are first combined to solve for the position of the transmitter. Moreover, by working on the independent phase signals themselves better noise performance can be achieved, since there will be no artefacts due to the intersection solution mechanism.

First of all, an embodiment of the interactive display system according to the invention is characterized, in that the location control means comprise coordinate update means for adding a coordinate update value to any of said first or second coordinate, said coordinate update value being determined from the first or second phase signal respectively. Note that in the known system, which uses intersection of surfaces, such an operation would only make sense if applied to the position obtained from solving the intersection and not if applied to the phase differences, because this would lead to non linear mapping from transmitter positions to target locations.

When updates are used, it is advantageous that the location control means comprise scaling means, for, at a first point in time, scaling said update value by a factor, the factor increasing in proportion to a second update value, the second update value occurring at a second point in time, the second point in time preceding the first point in time. In this way, the sensitivity of the system is varied, depending on the required motion: large movements can be attained with reduced movements of the transmitter, whereas small movements are not made hard to perform accurately due to oversensitivity. In two dimensional location control, the factor should preferably be identical for both coordinates.

In another embodiment of the interactive display system according to the invention any of the first and-/or second phase difference measuring means feed the location control means via phase differentiating means, the phase differentiating means being arranged for feeding a first and/or second time differentiated phase difference as phase signal to the location control means. Time differentiation can be implemented by subtracting successive phase values. Combined with the update means the time differentiation provides for proportional control of the target location. Note that without time differentiation, the update means provide integrating control, which makes it possible to make large moves with only small transmitter displacements.

A problem with the use of phase difference measurements is that the phase measurement has an inherent full cycle phase ambiguity. This causes a position ambiguity, reflected possibly in sudden target position jumps in response to small transmitter movements. It is possible to avoid such a position ambiguity by taking the distance between the receivers from any pair of receivers use to determine a phase difference less than a wavelength of the periodic signal, or by restricting the movement of the transmitter to a limited range of positions.

However, this solution may be undesirable. For example, if the transmitter is manipulated at some distance from the receivers, the phase change in response to a transmitter movement will vary proportionally to a first and second sensitivity ratio, the first ratio being a ratio of movement of the transmitter to its distance to the receivers and the second ratio being ratio of mutual receiver distance to periodic signal wavelength. Hence if the first ratio is small due to a large distance of the transmitter with respect to the receivers, it is desirable, in order to have good phase sensitivity, to have a large second ratio. However, this is attained at the price of phase ambiguity, and therefore measures are needed to handle the phase ambiguity.

In a further embodiment of the interactive display system according to the invention, the phase differentiating means feed the location control means via inertia retaining means, for setting any of the first and/or second phase signal as close to a further time differentiated phase difference as were attainable by adding an integer number of phase cycles to the time differentiated phase difference, the further time differentiated phase difference corresponding to the time differentiated phase difference at a previous point in time before a present point in time. Locations may change rapidly, but changes in rate of movement are much slower because they involve accelerations, which according to Newtons law of inertia are inversely proportional to mass. So if, for example, the transmitter is put on a human head, or held in the hand the mass of head or hand will restrict the rate of change of rate of movenment. In the embodiment, this is applied independently to independent phase signals and is used to remove the full cycle phase ambiguity inherent in phase measurements.

Another embodiment of the display system according to the invention is characterized in that the phase difference measuring means feed the location control means via phase reduction means, for reducing the phase signal to a value as close to a zero phase value as were attainable by adding an integer number of phase cycles to the phase difference. As long as displacements associated with full phase cycles are large compared to movements, for example because successive phase difference values are taken sufficiently fast after each other, this will also remove phase ambiguities.

It is furthermore advantageous that the phase difference measuring means feed the the location control means via jitter reduction means, for restricting the phase signal to a zero value unless the phase signal is outside a predetermined distance from said zero value. In this way small movements, caused for example by a tremble of the hand or noise in receiving are prevented from causing target location movements.

Another embodiment of the interactive display system according to the invention is characterized, in that it comprises averaging means, for feeding an averaged phase signal to the location control means. This too reduces the effect of trembling and noise.

In an embodiment of the interactive display system according to the invention said target location is indicated on the screen by a cursor shape, the cursor shape being independent of the target location.

In an embodiment of the interactive display system according to the invention the transmitter is provided in a mounting suitable for attachment to a human head.

This provides for hands free control of the target location. The advantages of this arrangement as compared to a mouse can be summarized by calling the transmitter a "louse":

it is smaller than a mouse
it does not need a tail
it can be carried on the head An embodiment of the interactive display system according to the invention is characterized, in that the plurality of receivers is provided on a manipulable mounting, provided with means for cordless coupling of the phase signal to the location control means. This is especially advantageous if the mounting is to be used at a distance from the transmitter which is larger than the distances amoung the receiver: by rotating the mounting, the relative position of the transmitter with respect to the configuration of receivers can be completely inverted without hardly displacing the mounting, whereas, to achieve the same effect by moving the transmitter, this transmitter should be moved over large distances.

BRIEF DESCRIPTION OF THE DRAWINGS

The interactive display system according to the invention will be explained using the following figures.

DESCRIPTION OF THE INVENTION

Figure 1:
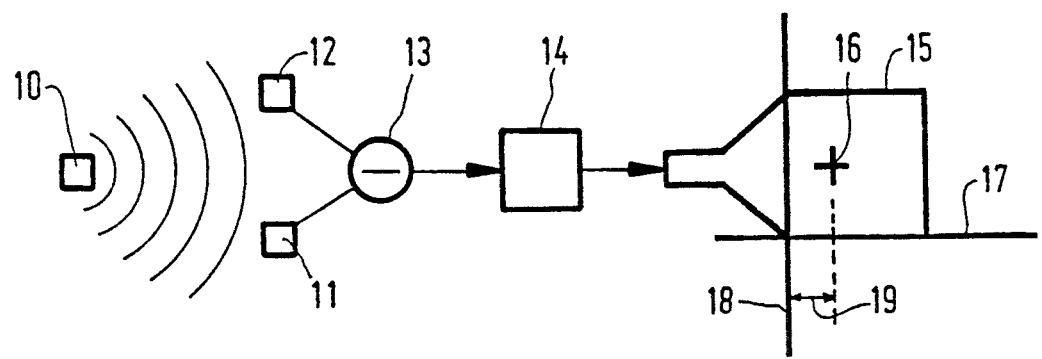
FIG. 1 shows an interactive display system according to the invention.

FIG. 1 shows, schematically, a system for controlling the coordinates along first and second coordinate axes 17, 18 of a target location 16 on a display surface 15. The target location is, for example, indicated by a cursor or crosshairs on a display screen, such as a CRT screen or a liquid crystal screen.

The position of the target location is controlled using an arrangement of a transmitter 10 and two receivers 11, 12. The receivers 11, 12 are coupled to phase detector 13, which feeds location control means 14. In use, the transmitter transmits some periodic signal, such as an acoustic (ultrasonic) signal or an electromagnetic signal, or any signal that takes a distance dependent time travelling through the space from the transmitter 10 to the receivers 11, 12. When the signal arrives at a receiver, the phase of receiving the signal therefore depends on the distance between the transmitter and the receiver concerned. The phase detector measures the phase difference between the phase of receiving the transmitted signal at the two receivers 11, 12. The phase detector may be any known phase detector, for example a detector which counts a number of cycles of a reference clock between two similar phase points on the signals received respectively at the first and second receiver 11, 12. The measured phase difference is used to control the target location along the first coordinate axis 17, for example by making the first coordinate 19 proportional to the phase difference.

The receivers 11, 12 are at fixed position with respect to each other, but the transmitter can be moved with respect to the receivers, or inversely, the receivers can be moved with respect to the transmitter. Such movement will cause a change in phase difference, and hence a change in target location.

Figure 2:
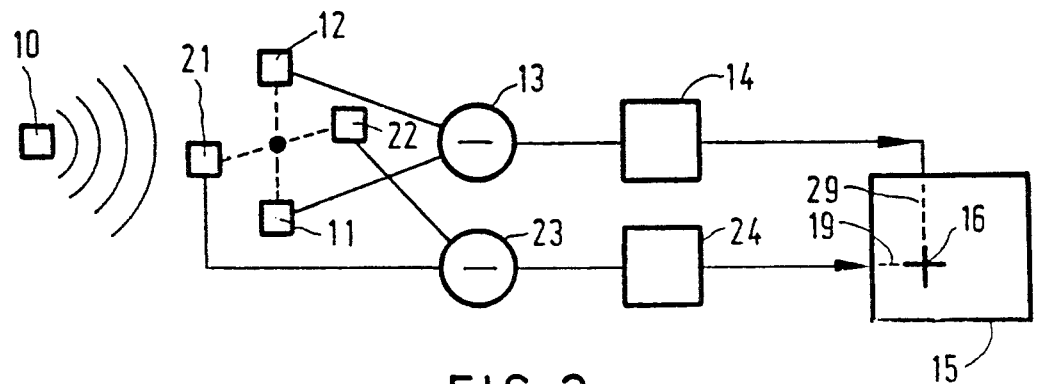
FIG. 2 shows an interactive display system according to the invention wherein two coordinates are controlled.

In FIG. 2, a similar system for controlling the target location in two dimensions is shown. Identical numbers as a in FIG. 1 indicate identical elements, and will not be discussed further. Compared to FIG. 1, FIG. 2 comprises an additional third and fourth receiver 21, 22, which are not on the same line as the first and second receivers 11, 12. The additional receivers also feed a phase detector 23 and control the target location along the second coordinate axis 18 on the display screen.

The two coordinates are controlled independently. This has the advantage that the system is of simple design, but as a consequence, the relative position of the transmitter 10 with respect to the receivers 11, 12, 21, 22 cannot stand in linear relation to the target location: for example, two movements of the transmitter 10 or the receivers 11, 12, 21, 22 with identical direction and amplitude, but starting at different locations, will cause movements with differing directions and amplitudes on the display screen 15. As will be explained below, this effect may be minimized. Moreover, because an operator causing these movements can observe their effect on the display screen and correct the movements to obtain the desired movements.

Figure 3:
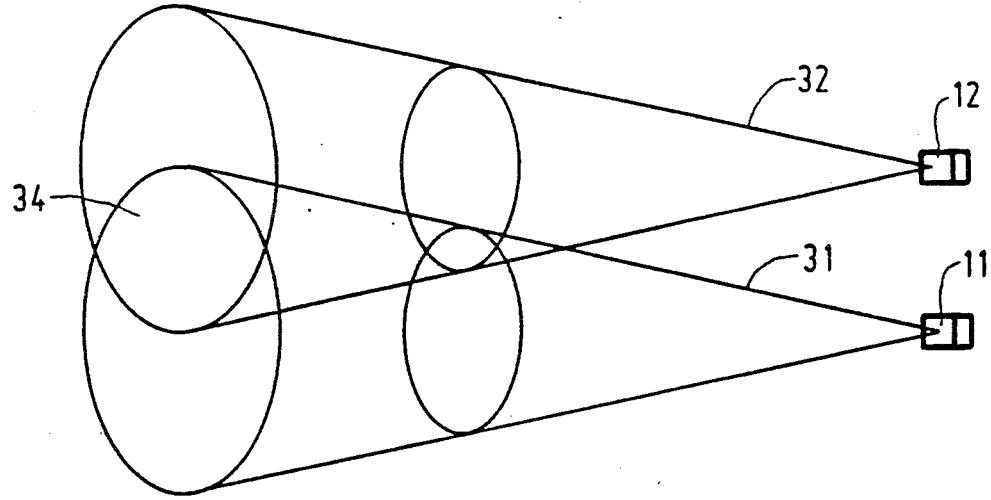
FIG. 3 shows regions of maximum sensitivity of receivers.

FIG. 3 schematically indicates the arrangement of the receivers. Most receivers 11 are directionally sensitive, that is, they are more sensitive for receiving signals from one direction than from another. The directions of highest sensitivity form a cone 31, which does not necessarily have a circular cross-section, but which extends along straight lines from the receiver 11 to infinity. The region of highest sensitivity of a pair of receivers 11, 12 is the overlap of such cones 31, 32. In case three or four receivers are used, not shown in FIG. 3, a similar overlap, but now of three or four cones delimits the region of highest sensitivity.

Preferably, such an overlap does not contain any receivers, or is not even close to it. This will improve the linearity of the correspondence between transmitter movements and target location movements in the maximum sensitivity region. Moreover, it is advantageous to avoid having the most sensitive range among the receivers, since this would obstruct the mainpulability of the transmitter with respect to the receivers in the most sensitive range. For example, if the transmitter were mounted on the head, it is desirable that the head should not have to be moved among the receivers, possibly even intercepting the signal between transmitter and receivers. Also, if the system is used for remote control, a region of maximum sensitivity at some distance from the receivers is desirable.

It is possible to make the overlap of the cones extend to inifinity. This is advantageous since it provides for a large manipulation space. Moreover, as will be explained below, this will improve the linearity of the relation between movements of the transmitter and resulting phase changes, because movements in such an overlap region will correspond to smaller changes in the angle between the lines connecting the transmitter to the receivers, than similar movement among the receivers.

Figure 4:
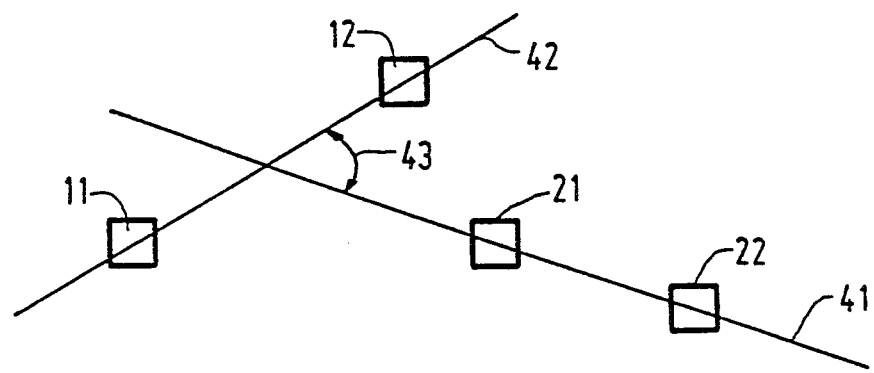
FIG. 4 shows a geometrical arrangement of receivers.

When a first phase difference between receiving at a first pair of receivers 11, 12 and a second phase difference at a second pair 21, 22 are used to control a two dimensional locator position on the display screen 15, it is neccessary that the receivers 11, 12 of the first pair are not both at identical positions as the receivers 21, 22 from the second pair. When the transmitter is manipulated in a region well away from the receiver, a further condition is desirable for good sensitivity. This is shown in FIG. 4, which represents the view from the transmitter towards the receivers 11, 12, 21, 22. In this view, the line 42 connecting the two receivers 11, 12 from the first pair and the line 41 connecting the two receivers 21, 22 from the second pair make an angle 43. For good sensitivity of the locator position to movements in all directions perpendicular to the line connecting the transmitter and the receivers, the angle 43 should be different from zero, and preferably near 90 degrees. If angles between different movements of the transmitter should give rise to identical angle between movements on the display screen, the angle between the coordinates axes on the screen should be identical to the angle between the two lines 41, 42 connecting the two pairs of receivers 11, 12 and 21, 22.

Figure 5:
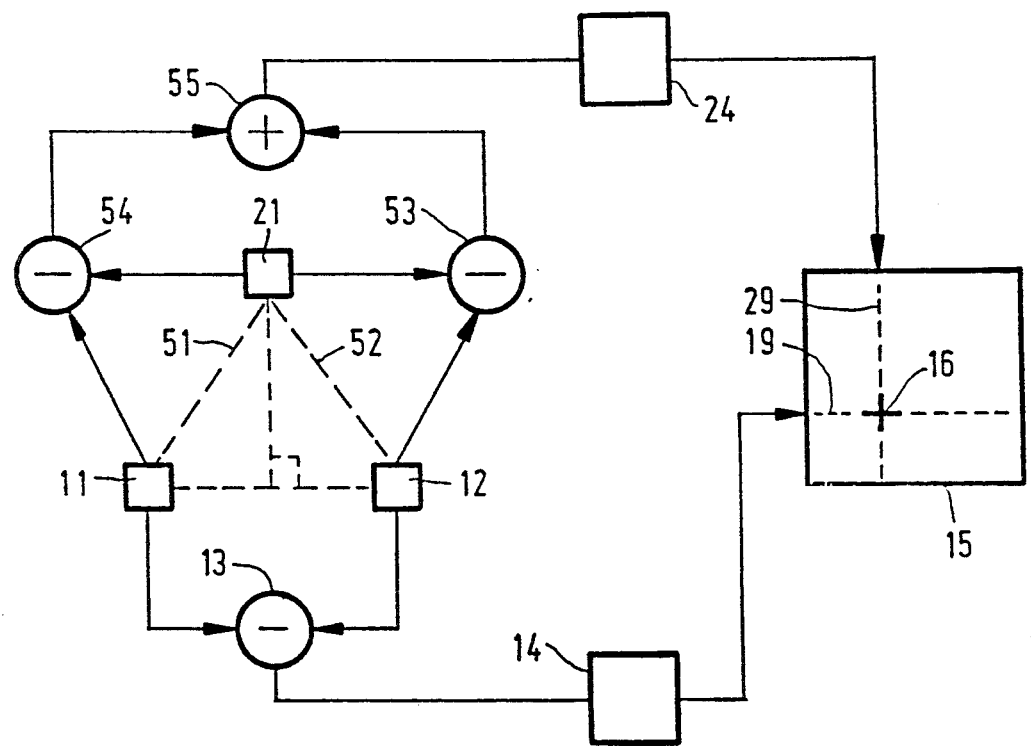
FIG. 5 shows an interactive display system according to the invention comprising three receivers.

Although in the foregoing four different receivers 11, 12, 21, 22 have been shown, it will be clear that three receivers are sufficient: one of the receivers 12 used to determine the first phase difference, may be also as one of the receivers 22 used to determine the second phase difference. Neither is it necessary that the phase differences used to control the target location are determined by directly detecting the phase difference at pairs of physical receivers. This is illustrated in FIG. 5. Here, two phase differences between receiving at two respective receivers 11 and 12 with respect to a common receiver 21 are determined in two phase detectors 53, 54 and subsequently fed to a summing circuit 55. The sum thus obtained corresponds to the phase difference of receiving at two virtual receivers, which, when the transmitter is sufficiently far away from the receivers, are approximately located at the common receiver 21 and at a point completing a parallelogram with the receivers 11, 21 and 12 as corners and the lines 51 and 52 as sides.

When the two lines 51, 52 from the common receiver 21 to the other receivers 11, 12 are equally long, the line connecting the virtual receivers is moreover perpendicular to the line connecting the other receivers 11, 12. These other receivers 11, 12 are then advantageously used to control an orthogonal further coordinate on the display screen.

Figure 6:
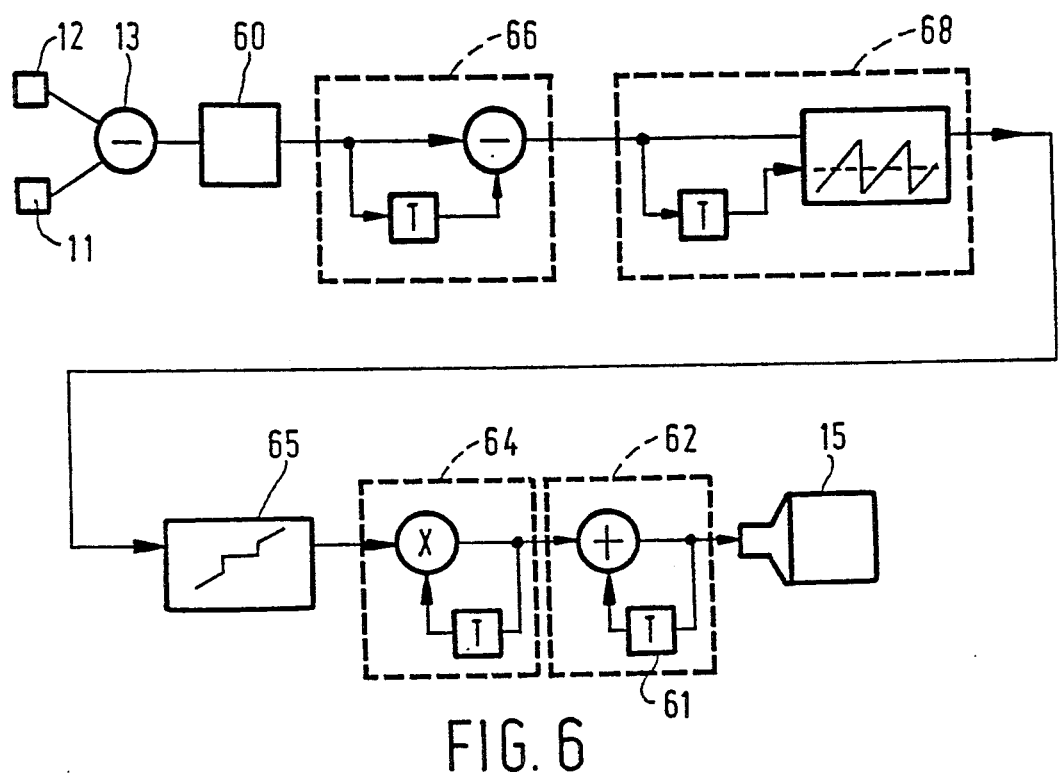
FIG. 6 shows a number of signal processing opertions applicable into an interactive display system according to the inventions.

FIG. 6 shows a number of signal processing operations to which any phase difference measurement may be individually subjected. As a first step, the phase difference measurement may be subjected to averaging in averaging means 60. This serves to reduce any noise in the phase difference measurement. To control the cursor position on the display screen 15, one may use an integrating control 62 which updates the target location coordinate by adding an amount received from the phase difference measuring means to the old target location coordinate value (symbolized by a single sample delay element 61). This can be used for pure integrating control, which provides the possibility to control the target location over a wide range using small but longlasting displacements of the transmitter with respect to the receivers.

The update signal may be scaled 64, using a previous change in coordinates to increase or diminish the update value. In this way, if the transmitter makes large movements the sensitivity of the system is increased, and in case of small movements the sensitivity is decreased. This has the effect that large movements reach their target more rapidly, whereas small movements do not exhibit oversensitivity which might lead to jitter due, for example to trembling of a hand controlling the position of the transmitter. This kind of jitter may also be removed by eliminating very small update values in jitter reduction means 65 which produce a zero output in case of small input.

Several variants are possible in scaling 64: for example, the scale factor may be obtained from an average of earlier update values, instead of from a single earlier update value as suggested in FIG. 6; also scaling may be non-linear, for example by leveling off of the scale factor, to prevent it from becoming too large or too small. When the system controls two coordinates of the target location, it is moreover preferable that both receive the same scaling factor, determined from a combination of update values for both coordinates.

It may also be convenient to include a differentiator 66 in the coupling from the phase difference measuring means 13 to the integrator 62. In principle, the combination of differentiation 66 and integration 62 yields an identity, but by the insertion of other signal processing operations in between (64, 65), the identity may be sacrificed to improve comfort and robustness.

Another option which is usefull in combination with differentiation is the removal of phase ambiguity. In principle any phase measurement suffers from full cycle phase ambiguity. This may lead to position ambiguity or sudden jumps in target position. This effect can be prevented by placing the receivers 11, 12 less than a wavelength apart. However this restricts the sensitivity of the system; the phase versus transmitter position sensitivity can be described by $$d\ phase = (a/wavelength) \times (dr/distance)$$

where "d phase" is the change in phase caused by a displacement "dr" of the transmitter with resepct to the receivers; "distance" is the distance from the receivers to the transmitter; "a" is the distance between the receivers. From the formula for dphase, it appears that for increasing distance, the sensitivity of the system decreases. Yet it is desirable to increase the distance, both to increase the linearity of position control and for user comfort. As appears from the formula, the sensitivity can again be improved by decreasing the distance between the receivers as compared to the wavelength of the periodic signal. However, when this distance is taken below the wavelength, phase ambiguities become a problem.

To remove phase ambiguities, inertia preserving means 68 are included. The idea is that movements of the transmitter may be very fast, causing very large phase changes. However, accelerations "a", that is changes in rate of phase change, are slow, because, due to Newtons law of inertia (F=ma) for a given force "F" they are reduced by mass "m". Hence, for example, the rate of change of head movement will change only slowly, so if the transmitter is mounted on the head only small changes of the rate of change of the phase difference will occur. This may be used 68, correcting any phase ambiguity by adding an integer number of phase cycles to the time differentiated phase diffences, choosing the integer number such that the new phase difference is as close as possible to an old phase change.

If transmitter movement is not to fast compared to the speed at which phase samples are taken, instead of the abovedescribed phase correction, a simple correction of the time differentiated phase difference to a value as close as possible to zero as can be attained by adding an integer number of phases can be used instead of inertia control 68.

At any stage in FIG. 6 additional averaging operations 60 may be added to reduce noise. Although FIG. 6 suggests a pipelined processing system, it will be clear that any processing, for example, using a microprocessor can be used to implement FIG. 6. Furthermore, the operations are shown together for simplicity; the operations 60, 62, 64, 65, 66, 68 may be used in isolation or in combinations. FIG. 6 does not intend to suggest that they are only useful in combination.

Figure 7:
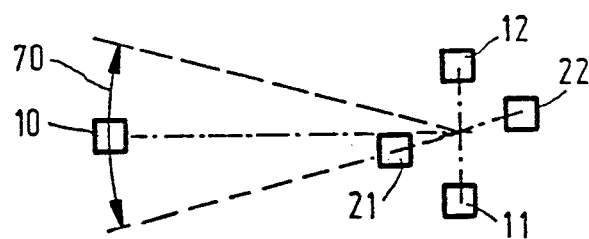
FIG. 7 shows the effect of manipulation of a transmitter.
Figure 7A:
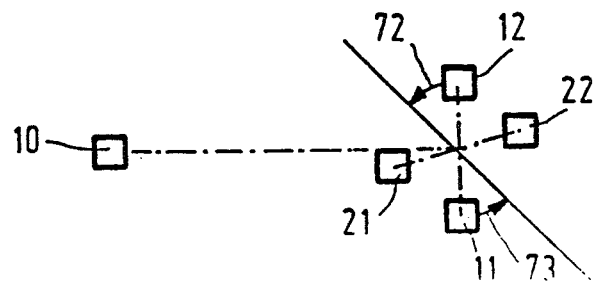
FIG. 7a shows the effect of manipulation of a plurality of receivers.

Either the transmitter or the plurality of receivers 11, 12 or both may be manipulated to control the target location. However, if good sensitivity at large distances is required it is convenient to manipulate the plurality of receivers. The reason for this is depicted in FIGS. 7 and 7a. A similar lateral displacement 70 of the transmitter will cause a decreasingly small change in angle as the distance between receivers and transmitter increases. On the other hand a small rotation 72 of the plurality of receivers will produce a large angular variation, independent of the distance between the transmitter and the receivers. For large distance applications it is therefore convenient to mount the transduces on a manipulated platform; clearly, this will apply for any interactive display system where the angular position of the transmitter with respect to the receiver is used: it is not restricted to systems where the phase difference of receiving between pairs of receivers are used to control the target location independently. To preserve the advantage of cordfree control, some transmission system for feeding the target location on the display screen should then be included.

For not too large distances, it is preferable to manipulate the transmitter, since this component can be made very small and light. For some purposes, a head mounting may be provided, such as a clip connected to the transmitter, for clipping it on a pair of glasses, or a pair of glasses including a transmitter. In this case it is perhaps appropriate to call such a transmitter a "louse", since it performs a function similar to that of a "mouse" but it is smaller than a mouse
it does not have a tail to connect it to the rest of the system
it can be worn on the head.

For the periodic signal, sound or electromagnetic signals may be used. The choice of frequency of this signal is determined by the convenience of its wavelength. The sensitivity of the system increases as smaller wavelengths are used, however at the expense of increased phase ambiguities. In practice, with the receivers arranged around a conventional display screen of a personal computer, or a television screen, a wavelength in the order of a centimeter, as used for example in ultrasonic remote control units for consumer televisions, which operate at about 40 kHz has been found to be convenient. However, the present invention is obviously not limited to such wavelengths or to sound.

We claim:

1. Interactive display system, comprising
   a transmitter, for transmitting a periodic signal which is suitable for propagation through the air to
   a plurality of substantially pointlike receivers at respective fixed positions with respect to each other, whereas a relative position of the transmitter with respect to the plurality of receivers is manipulatable, the receivers being suitable for receiving said periodic signal, a first and a second receiver from the plurality feeding
   first phase difference measuring means, for measuring a first phase difference between said receiving the periodic signal at the first and second receiver, the first phase difference measuring means feeding
   location control means, for on the basis of a received phase signal controlling a target location on the display screen,
   characterized, in that the location control means are arranged for controlling a first coordinate of the target location along a first predetermined coordinate axis on the display screen, independent of a second coordinate along a second coordinate axis which is oriented across the first coordinate axis.

2. Interactive display system according to claim 1, in which
   a third and fourth receiver from the plurality of receivers feed
   second phase difference measuring means, for determining a second phase difference, using said receiving of the periodic signal at the third and fourth receivers, the second phase difference measuring means feeding
   the location control means, for on the basis of a second received phase signal cocontrolling the target location, wherein a first plane through the transmitter and the first and second receiver does not coincide with a second plane through the transmitter and the third and fourth receiver, characterized, in that the location control means are arranged for controlling the second coordinate of the target location with respect to the second coordinate axis, under control of the second phase difference signal, independent of the first phase difference signal.

3. Interactive display system according to claim 2, the first, second, third and fourth receivers exhibiting respective first, second, third and fourth spatial cones of directions of highest directional receiving sensitivity, characterized, in that the first, second, third and fourth receivers are directed such that the first, second, third and fourth spatial cones overlap in a manipulation region, the manipulation region not including a plane through the first second and third receivers.

4. Interactive display system according to claim 3, characterized, in that said manipulation region is a maniplupation cone extending to infinity.

5. Interactive display system according to claim 2, characterized, in that the first coordinate axis and the second coordinate axis cross each other at an angle, a first line through the first and second receivers making the same angle with respect to a second line through the third and fourth receivers.

6. Interactive display system according to claim 5, characterized, in that the angle is 90 degrees.

7. Interactive display system according to claim 2, characterized, in that the second receiver is also the fourth receiver.

8. Interactive display system according to claim 7, characterized, in that the first, second and third receivers form three corners of an isosceles triangle, the third receiver being at the top angle, the second coordinate axis being perpendicular to the coordinate axis, the second phase difference being determined as a sum of further phase differences between the receiving at the first and third and the receiving at the second and third receivers respectively.

9. Interactive display system according to claim 1 or 2, characterized, in that the location control means comprise coordinate update means for adding a coordinate update value to any of said first or second coordinate, said coordinate update value being determined from the first or second phase signal respectively.

10. Interactive display system according to claim 9, characterized, in that the location control means comprise scaling means, for, at a first point in time, scaling said update value by a factor, the factor increasing in proportion to a second update value, the second update value occurring at a second point in time, the second point in time preceding the first point in time.

11. Interactive display system according to claim 9, characterized, in that any of the first and/or second phase difference measuring means feed the location control means via phase differentiating means, the phase differentiating means being arranged for feeding a first and/or second time differentiated phase difference as phase signal to the location control means.

12. Interactive display system according to claim 11, characterized, in that the phase differentiating means feed the location control means via inertia retaining means, for setting any of the first and/or second phase signal as close to a further time differentiated phase difference as were attainable by adding an integer number of phase cycles to the time differentiated phase difference, the further time differentiated phase difference corresponding to the time differentiated phase difference at a previous point in time before a present point in time.

13. Interactive display system according to claim 1 or 2, characterized, in that the phase difference measuring means feed the location control means via phase reduction means, for reducing the phase signal to a value as close to a zero phase value as were attainable by adding an integer number of phase cycles to the phase difference.

14. Interactive display system according to claim 1 or 2, characterized, in that the phase difference measuring means feed the the location control means via jitter reduction means, for restricting the phase signal to a zero value unless the phase signal is outside a predetermined distance from said zero value.

15. Interactive display system according to claim 1 or 2, characterized, in that it comprises averaging means, for feeding an averaged phase signal to the location control means.

16. Interactive display system according to claim 1 or 2, characterized, in that said target location is indicated on the screen by a cursor shape, the cursor shape being independent of the target location.

17. Interactive display system according to claim 1, 2 or 3, characterized, in that the transmitter is provided in a mounting suitable for attachment to a human head.

18. Interactive display system according to claim 1, 2 or 3, characterized, in that the plurality of receivers is provided on a manipulable mounting, provided with means for cordless coupling of the phase signal to the location control means.

19. Interactive display system according to claim 1 or 2, characterized, in that the signal suitable for propagation through the air is an acoustic signal.

20. Interactive display system according to claim 1 or 2, characterized, in that the signal suitable for propagation through the air is an electromagnetic signal.

\* \* \* \* \*